Figure 5:
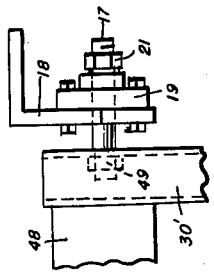

April 7, 1964  A. R. HUTCHINSON ETAL  3,127,940
CULTIVATOR ASSEMBLY
Filed Dec. 1, 1960  2 Sheets-Sheet 1

INVENTORS
ALLEN R. HUTCHINSON
WILLIAM A. HUTCHINSON, DECEASED
By JEAN M. HUTCHINSON, ADMINISTRATRIX

BY Fisher Christen & Godson
ATTORNEYS

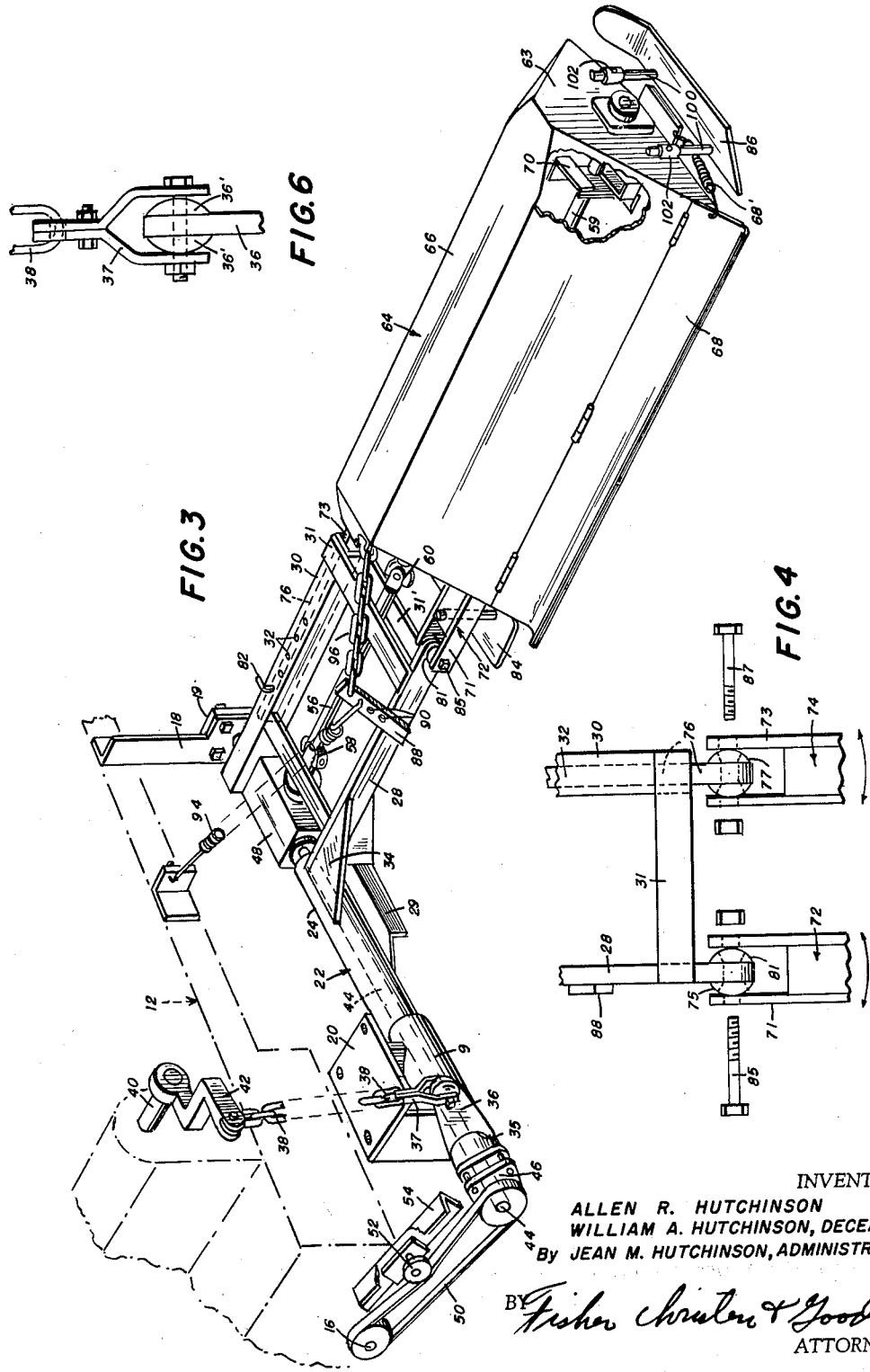

United States Patent Office 3,127,940
Patented Apr. 7, 1964

3,127,940
CULTIVATOR ASSEMBLY
Allen R. Hutchinson, 1216 W. Central Ave., Orlando, Fla., and William A. Hutchinson, deceased, late of 2214 Stanley Ave., Orlando, Fla., by Jean M. Hutchinson, administratrix, Orlando, Fla.
Filed Dec. 1, 1960, Ser. No. 73,142
4 Claims. (Cl. 172—79)

This invention relates to a cultivator assembly for attachment to the frame of a tractor, and is specifically directed to that type of cultivator for orchards and the like which extend outwardly from the side of the tractor a sufficient amount to enable the cultivator to reach under tree branches and the like so that areas closely adjacent the tree trunk may be properly tilled.

An important objective of this invention is to provide framing structure for a plurality of cutting blades whereby the axis upon which the blades are mounted may be varied angularly with respect to the direction of travel of the tractor in a manner that the soil being disturbed will move toward, or away from, the end of the frame as the angular relationship of the axle of the cultivating members is changed.

A further objective of this invention is to provide a housing for a plurality of power operated cultivating members which rotate upon an axis substantially normal to the direction of travel such that the housing may be varied vertically with respect to the earth's surface without disturbing the power transfer means.

A still further objective of this invention is to provide a first framing member which supports a rotating reel assembly and has means housing a rotating shaft which supplies the power for the reel assembly. The framing member is mounted so that it permits the assembly to pivot vertically with respect to the tractor without affecting the shaft.

Another important objective of this invention is to provide a power train within the cultivator assembly which requires only one 90° transfer joint.

A still further important objective of this invention is to provide a frame for a rotating reel-type blade cultivator such that the frame will be able to float free and swivel at ball point connections permitting the frame to follow the contours of the ground during operation, the only restriction to such movement being a chain connection from the main support of the assembly.

Another important objective of this invention is to provide a reel frame housing adjustable angularly horizontally with respect to its vertically pivotable mounting so that the cultivator assembly may vary its attitude in both directions with respect to the direction of travel. In this manner the assembly can account for varying soil conditions and the cultivating results desired.

A very important objective of this invention is to provide a means by which the reel frame assembly may have various angular positions which may be fixed while the machine is in operation. This is accomplished by having one of its edge framing members slidably received in the main frame and having associated fastening means to secure it in place.

A still further objective of this invention is to provide a power transfer means from a conventional tractor power supply which is adjustable to compensate for a lost motion which occurs when the assembly is in use.

A still further objective of this invention is to provide all bearing-type joints at various places along the load transfer means so that the points of power transfer are also bearing points.

Figure 2:
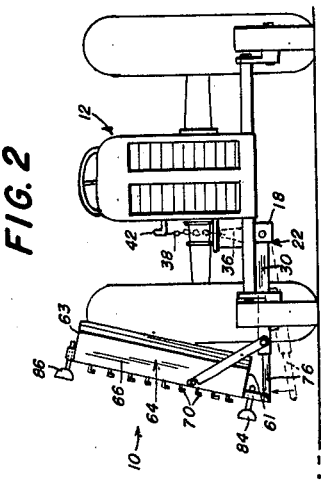
Figure 1:
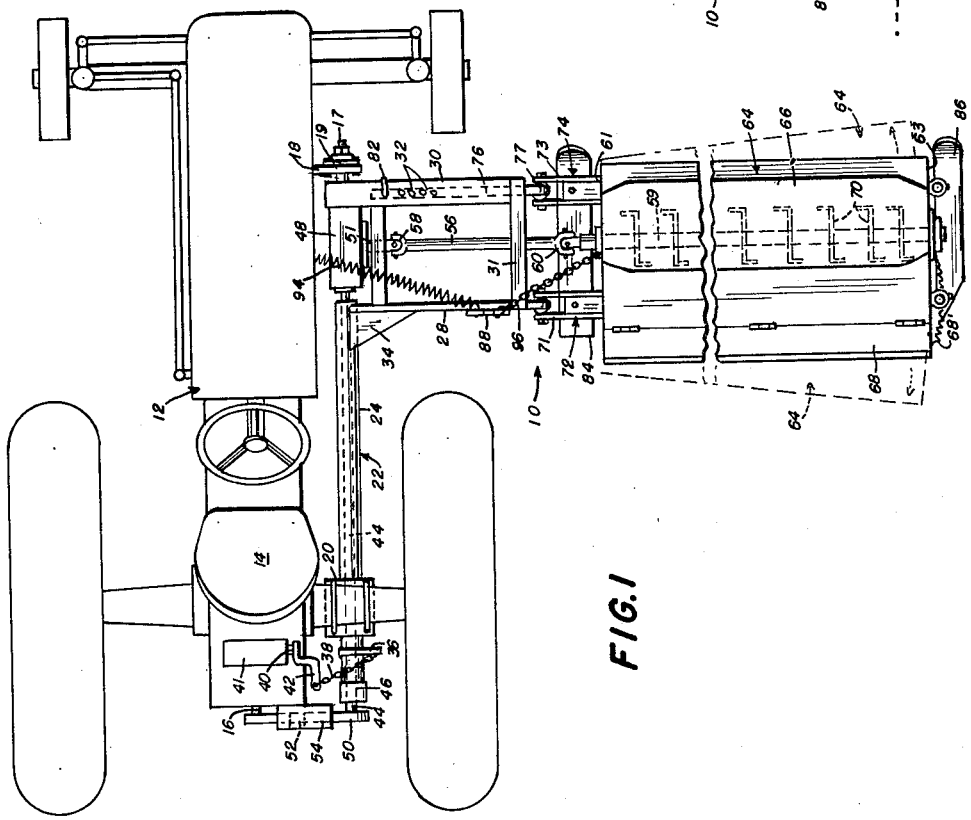

Further objects and advantages of the invention will be apparent from the following description taken in conjunction with the accompanying drawings wherein:

FIG. 1 is a plan view of the invention with portions broken away;
FIG. 2 is a front end view of the equipment showing the reel assembly in its retracted position;
FIG. 3 is a perspective view of the invention showing the important operating features of the invention;
FIG. 4 is a view of the joint between frames;
FIG. 5 is an exploded view of a support point; and
FIG. 6 is an exploded view of a connecting point.

Referring now specifically to the drawings where like numbers indicate like parts, the assembly of this invention is indicated by the numeral 10. The assembly is adapted for attachment to a conventional tractor 12. In the embodiment disclosed the tractor is of the wheeled type having a power take-off shaft 16 conveniently located behind the operator's seat 14. A pair of brackets 18 and 20 are welded or otherwise fixedly secured to a longitudinal side of the tractor and support the assembly thereto.

A generally F-shaped subframe 22 is supported between the brackets 18 and 20. This subframe is comprised of a tubular leg 24 and a pair of parallel arms 28 and 30 perpendicular thereto. The arm 30 is a rectangular tube with a series of apertures 32 formed therein, and arm 28 is comprised of solid bar stock and is secured to the leg 22 by way of a welding plate 34. The arms are secured in fixed relationship with each other by way of channel iron 29 and straps 31 and 31'. Bracket 20 is formed with a cylindrical loop 9 which rotatably supports tubular leg 24.

The manner in which subframe member 22 is attached to bracket 18 is best seen in FIG. 5. A stud 17 threaded at both ends extends through apertures in bracket 18 and in the extension 30' of arm 30. A flanged bearing piece 19 and a nut 21 are used to secure the stud to the bracket. The stud carries the radial load to which the cutter assembly is subjected and the thrust load is placed on the stud by nut 21 pulling against the stud and bearing piece. This arrangement eliminates the full thrust load being transmitted to the rear axle mounting. In other words, it aids in distributing the thrust load to both brackets, while permitting a vertical pivoting motion. Nut 49 merely secures the other end of the stud 17.

A lug 36 extends radially outward from the leg 24 at 35. A chain 38 is attached to the outer end of this lug, which lug is in turn connected to an operating rod 40 by way of a linkage member 42. The operating rod 40 may have control means such as hydraulic lift 41 extending to a point within easy reach of the operator. Note in FIG. 6 that lug 36 is formed with a ball joint 36' at its outer end to receive a connecting bracket 37 which is in turn connected to chain 38.

As can best be seen by referring to FIG. 3, if linkage 42 is rotated in a clockwise direction, the entire subframe 22 will be pivoted upwardly a limited amount toward the tractor to a position as seen by the solid lines in FIG. 2 (see element 30). By this means, the subframe 22, and the structure supported thereby, may have its weight varied with respect to the ground surface. It should also be noted that chain 38 provides a stop to prevent subframe 22 from over-pivoting in the event a ravine or the like is encountered, but provides no obstacle to the subframe pivoting within loop 21, in response to irregularities in the ground surface.

A drive shaft 44 is axially received in leg 24 and is supported by a bearing coupling 46 at one end of the leg, and by a right-angle drive gear housing 48 at the other end thereof. The gear housing 48 is supported between the inner portions of arms 28 and 30. An endless chain or belt 50 connects the drive shaft with the rotating shaft 16 previously mentioned. The respective ends of the two shafts are equipped with pulleys or sheaves to receive the chain. An exterior idler sprocket 52 is mounted on a bracket 54 for adjustably varying the tension in chain 50. Within the housing 48 is a conventional 90° power coupling which is the only one necessary in the cultivator assembly.

The rotary power may be traced in FIG. 1. The motion is transferred from shaft 16 to shaft 44 by way of belt 50. The shaft 44 carries the motion to housing 48 where a 90° turn is accomplished and power comes out via stub 51. Stub 51 is connected to a telescoping shaft 56 of conventional construction by a universal joint 58, and the main cultivator support axle 59 receives the motion through universal joint 60.

The axle 59 is rotatably supported in side plates 61 and 63 of the framing housing 64. The housing 64 is protective in nature and basically is comprised of the side plates, a cover 66 and a tail flap 68. A plurality of cultivator knives 70 are spaced along the length of axle 59 and rotate therewith. A pair of double railed support bars 72 and 74 run the longitudinal length of housing 64 and provide a framing therefor.

Yokes 71 and 73 are formed at the inboard ends of rails 72 and 74, respectively. A spherical joint 75 at the outer end of arm 28 is received by yoke 71. An extension 76, having a plurality of apertures therein adapted to mate with the apertures 32 in leg member 30 is formed with a spherical joint 77 which is received by yoke 73. Flared channels 81 and 83 (see FIG. 4) in spheres 75 and 77 permit bolts 85 and 87 to secure the yokes to the spheres in a manner unrestrictive of swivel movement. These ball joints and flared channels of the yokes permit the frame to swivel an amount necessary to absorb many of the vibrations encountered, and aid in the efficiency and durability of the assembly.

The cultivator housing assembly 64 can have its lateral angular relationship with respect to arms 28 and 30 varied to the extent of telescoping permitted between extension 76 and arm 30. After the desired angulation is determined, the apertures in extension 76 and the apertures in leg 32 are matched and a pin such as that indicated by the numeral 82 is inserted and the assembly locked in this adjusted position.

It can be seen, therefore, that the angle between housing or cultivator head 64 and the subframe 22 can be adjusted and locked into position. The housing 64 has a plurality of ground-engaging skid members 84 and 86 along the lower surface thereof. It can also be seen that the housing 64 easily follows the irregularities of the earth's surface by riding on skids 84 and 86 pivoting vertically by way of subframe 22. Note that the skids have rods 100 adjustably received in sleeves 102 of the cultivator head.

As seen in FIG. 3, extending upwardly from leg 28 is a pivotable lug 88 having a plurality of apertures 90 therein. This lug is attached to the main tractor frame by way of spring 94 which is under tension in its normal position. The lug 88 is also attached to housing 64 by way of the chain 96. These elements, working in cooperation with the position of lug 36, permit the proper weight on cultivator knives 70 as they cut the ground.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention as comprehended within the scope of the accompanying claims.

We claim:

1. In agricultural implements of the character adapted to be carried by a mobile vehicle having power take-off means, the combination including, elongated subframe means, means to mount said subframe means horizontally on a mobile vehicle for limited rotation about a horizontal axis parallel with the direction of travel of the vehicle, power-driven cultivator means to be disposed laterally with respect to said subframe means, first and second pivotal connecting means having limited universal swivelling action, first and second attaching means to join said pivotal connecting means with said subframe means and said cultivator means, respectively, said pivotal connecting means being disposed in horizontally spaced relationship, one of said attaching means including means to vary the horizontal distance between one portion of the cultivator means and the subframe means to vary the angular relationship between the cultivator means and said subframe means, said swiveling action of the pivotal connecting means also permitting the cultivator means to follow the contour of the ground regardless of its angular relationship to the vehicle, and power-transmitting means to connect the power take-off means of the mobile vehicle with said cultivator means.

2. The invention as defined in claim 1, wherein said one of said attaching means comprises a first elongated element projecting laterally of said subframe means and fixed thereto at one of its ends, and a second elongated element having one end fixed to one of said pivotal connecting means, and means to position said two elements in telescoping relationship.

3. The invention as defined in claim 2, wherein one of said elements is tubular and the other said element is slidably received therein.

4. In mounting structures for attaching a cultivator implement to a tractor frame, the combination including, subframe means including a first elongated member, means to mount said member on a tractor frame to position the member generally parallel to the direction of travel, said mounting means including pivot means to permit limited oscillation of the member about an axis parallel with the direction of travel of the vehicle, cultivator means including a second elongated member to be disposed generally horizontally and laterally spaced from said first member and to extend generally transversely to the direction of travel, first and second arms connected between said first and second elongated elements in horizontally spaced generally parallel relationship, each of said arms including a pair of subsections joined to each other by pivotal connecting means having limited universal movement to permit the cultivator means to follow the contour of the ground, one section of each arm being rigidly connected to said first elongated member, the other section of each arm being rigidly connected to said cultivator means, one of said arms including means to adjust the distance between the extremities of said one arm to adjust the angular relationship of the cultivator means.

References Cited in the file of this patent

UNITED STATES PATENTS

| 1,089,071 | Oden et al. | Mar. 3, 1914 |
| 2,299,842 | Moyer | Oct. 27, 1942 |
| 2,694,355 | Pertics et al. | Nov. 16, 1954 |
| 2,748,679 | Rogers | June 5, 1956 |
| 2,871,804 | Pounds et al. | Feb. 3, 1959 |
| 2,974,469 | Smith et al. | Mar. 14, 1961 |
| 3,054,461 | Maguire | Sept. 18, 1962 |

FOREIGN PATENTS

| 167,328 | Australia | Mar. 27, 1956 |